United States Patent [19]
Buss

[11] 3,916,834
[45] Nov. 4, 1975

[54] FISH HUSBANDRY SYSTEM

[75] Inventor: Keen W. Buss, Boalsburg, Pa.

[73] Assignee: Marine Protein Corporation, Londonderry, N.H.

[22] Filed: Jan. 10, 1974

[21] Appl. No.: 432,306

Related U.S. Application Data

[63] Continuation-in-part of Ser. No. 162,910, July 15, 1971, abandoned, which is a continuation-in-part of Ser. No. 16,830, March 5, 1970, abandoned.

[52] U.S. Cl. ................................................. 119/3;
[51] Int. Cl.² ........................................ A01K 61/00
[58] Field of Search ................................... 119/3, 5

[56] References Cited
UNITED STATES PATENTS

| | | | |
|---|---|---|---|
| 3,116,712 | 1/1964 | Ogden et al. | 119/3 |
| 3,726,251 | 4/1973 | Fremont | 119/3 |
| 3,756,197 | 9/1973 | Buss et al. | 119/3 |
| 3,771,492 | 11/1973 | Doherty | 119/3 |

OTHER PUBLICATIONS
Innovations for Fish Culturists No. 1, 1968, Keen Buss, Jack Miller & Kenneth Corl, pp. 1–6.

*Primary Examiner*—Hugh R. Chamblee

[57] ABSTRACT

A fish husbandry system which provides for intensive raising of fish under controlled conditions. The fish are confined in one or more upright, water-filled tanks through which water is conducted in serial flow by conduits. Oxygen is introduced into the water by suitable means to provide a desired oxygen level. The flow of water within each tank is from the bottom to the top at a sufficient upward laminar flow rate so that fish waste products are carried upwardly and out of the tank and also so that the head of water within the tank assists solution of the oxygen and maintenance of the desired oxygen level in the water. Waste products, solid and dissolved, are removed from the water as it passes from one tank to the next.

10 Claims, 7 Drawing Figures

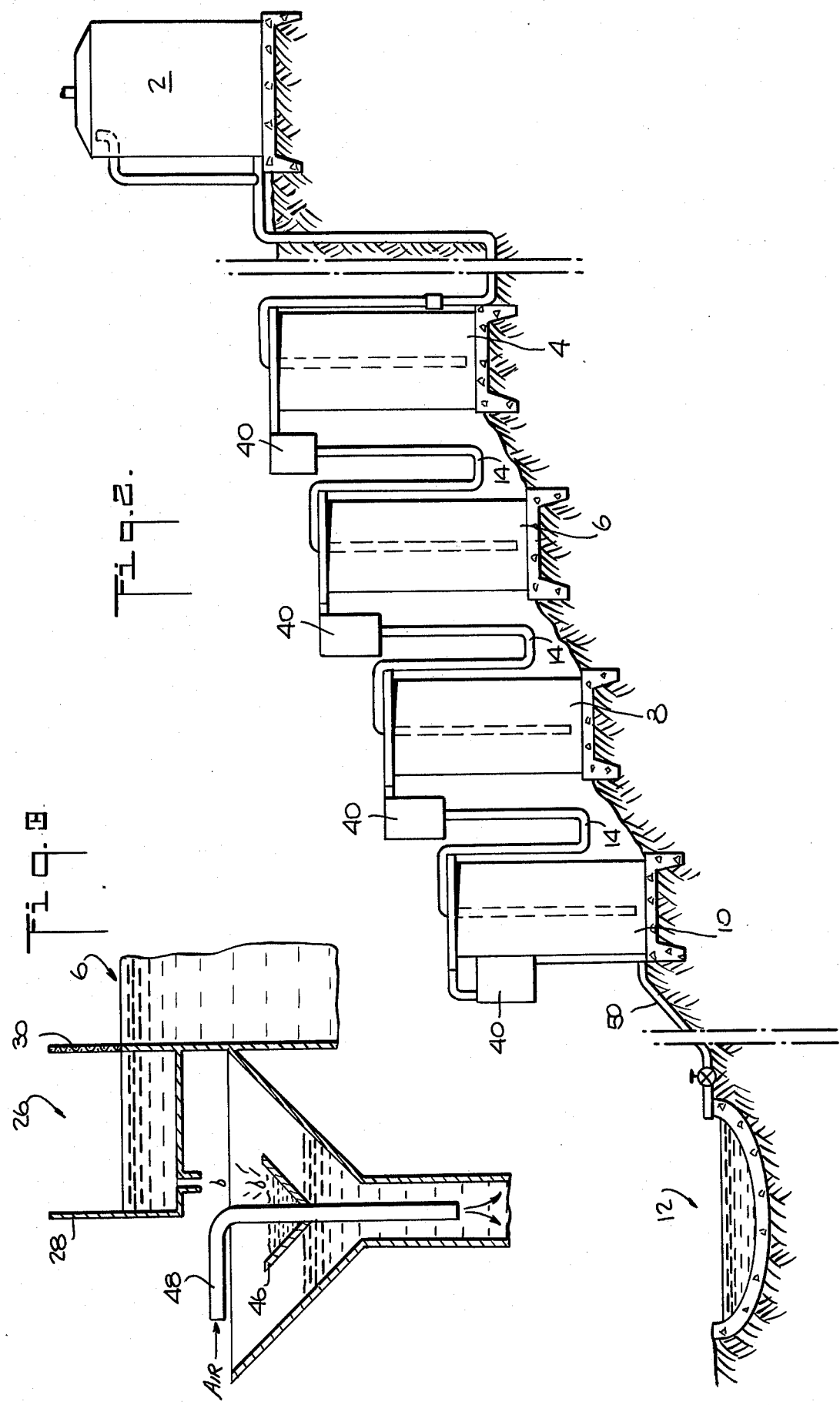

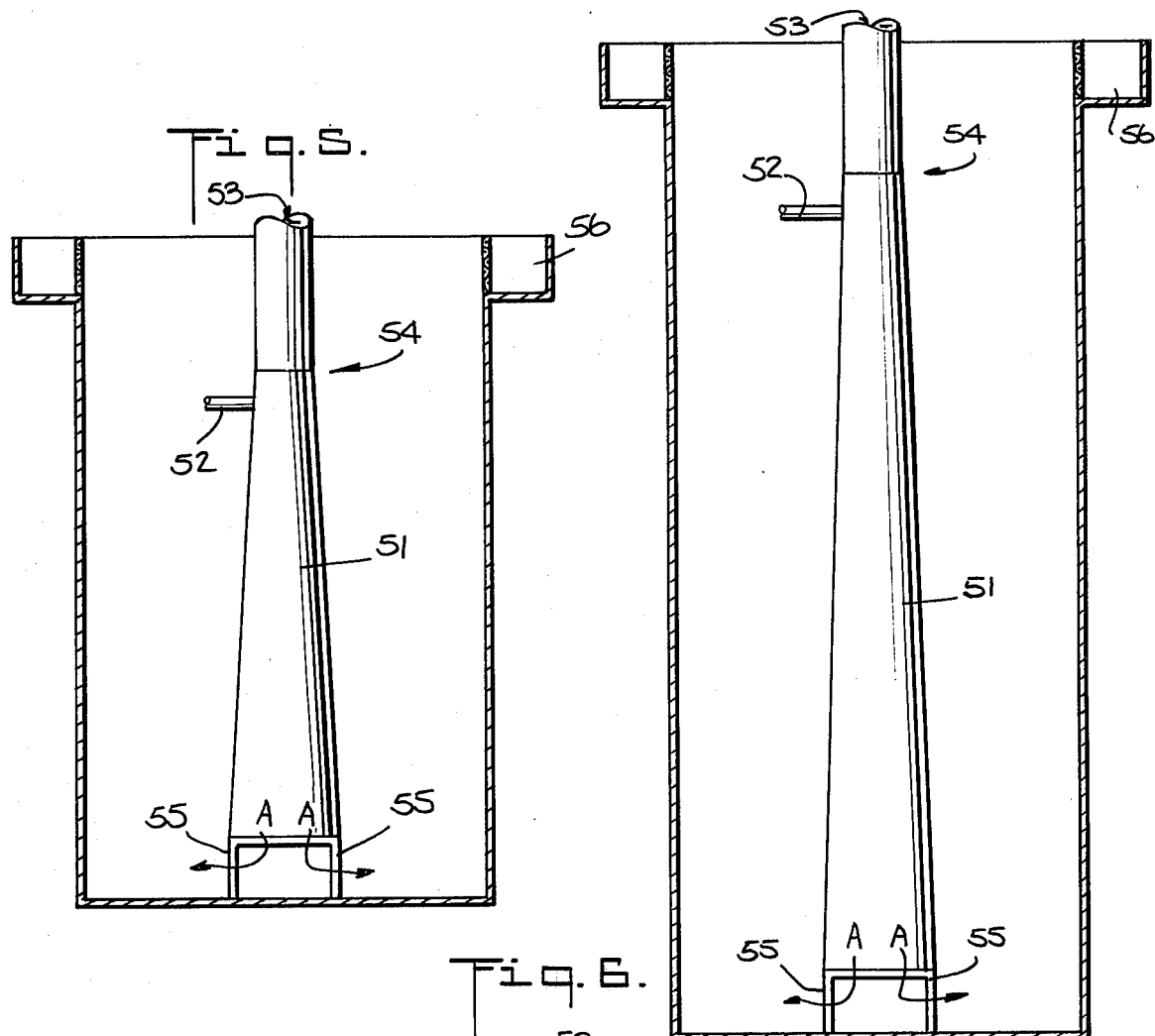
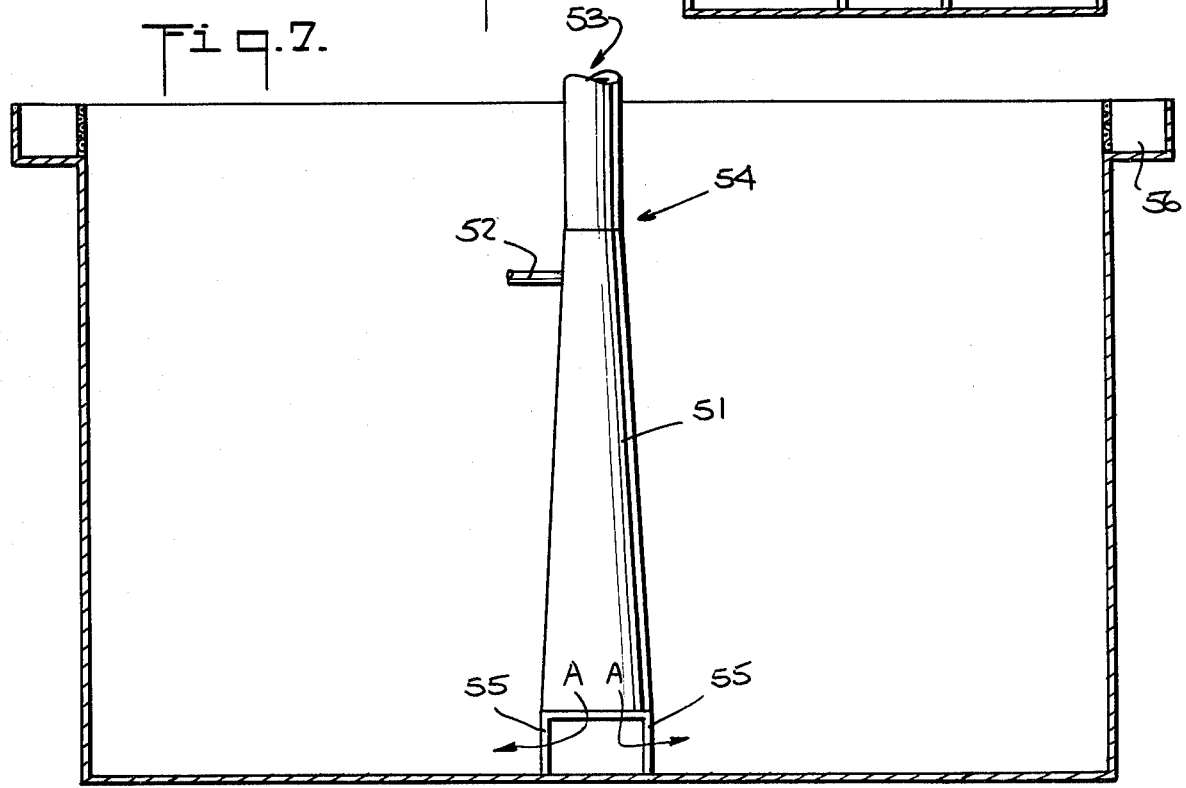

FISH HUSBANDRY SYSTEM

RELATED APPLICATIONS

This application is a continuation-in-part of application Ser. No. 162,910, filed July 15, 1971 which is a continuation-in-part of application Ser. No. 16,830, filed March 5, 1970, now both abandoned.

BACKGROUND OF THE INVENTION

This invention relates to a system for raising fish in a controlled environment, and more specifically for intensive fish farming for commercial purposes at high fish densities.

Fish husbandry in a controlled environment, sometimes referred to as fish farming, offers numerous advantages which are by now well known. Some of these advantages are the ability to provide large quantities of good quality high protein food at a relatively low cost, the opportunity to regularize the supply of gourmet fish subject in nature to seasonal fluctuations and the ability to conduct operations at inland locations thereby increasing the availability of fish to residents located far from the coastline.

Such commercial potential has stimulated interest in fish husbandry and it has been discovered experimentally that confined fish can be grown in much higher concentrations of fish per cubic foot of water than was formerly believed possible. For example, under suitable conditions fish can be raised at concentrations in excess of 6 pounds of fish per cubic foot of water. To grow fish at this density commercially would be very advantageous as it would offer the opportunity to obtain a maximized yield of fish within the limitations of space available, and oxygen and water supply.

Currently known fish farming methods, however, would not generally be adaptable to fish farming at such high concentrations by reason of limitations inherent in their design which render it impossible to achieve the unusually high through-put of oxygen, food and water necessary to sustain fish life at such concentrations. One prior system utilizes a plurality of tanks arranged in a cascade with walls dividing each tank internally into a fish room and a filter room. Water passes through a filter in the bottom of the fish room, into the filter room from which the filter water overflows and falls into the open top of the fish room of the next succeeding downstream tank. Aeration of the water is through exposure of the surface of the water in the fish room to the atmosphere. Although satisfactory for its intended purpose, such a prior structure, relying solely on exposure of the water surface to the atmosphere, would not provide sufficient oxygen necessary to sustain the life of fish contained at extremely high concentration within the tank. This is because fish, at a high concentration, requires very large amounts of oxygen to be supplied to the water (a) because of the aggregate breathing demands of the very large number of fish present, and (b) to oxidize and thus offset the toxic effects of the considerable output of waste products which the numerous fish produce in the body of water within which they are confined.

Additionally, the prior art structure just described, relying on a flow of water downwardly within each fish room, does not provide any hydrostatic head of water assisting the dissolution of oxygen at the point at which it is introduced, namely the surface of the water in the fish room. Even if additional air were bubbled into the bottom of the water in the filter room so that the water was oxygenated prior to entering the next fish room downstream, the water would still enter at the water surface in the next fish room and much of the oxygen would pass out of solution there and be lost.

Another problem with the prior structure, which exemplifies the state of the art generally, if it were to be used for high concentration fish farming, would arise in connection with the high output of solid, fish waste products from the large number of fish involved, which would be carried downwardly by the flow of water in the fish room and accumulate on the bottom. To avoid a buildup of toxic products to a dangerous level and to prevent clogging of the water flow, it would frequently be necessary to drain the tanks for cleaning, presenting a major problem in the fish raising operation.

SUMMARY OF THE INVENTION

The present invention provides a system of fish husbandry which permits the raising of fish in extremely high concentrations within a given volume of water while providing all the conditions necessary for sustaining life and growth in terms of supply of water, oxygen and food and removal of waste products. For example the concentrations which this invention makes possible are of the order of six pounds of fish per cubic foot of water, or even higher.

More specifically, a fish husbandry system according to the present invention in an exemplary embodiment, includes a plurality of generally vertical, water-filled tanks each adapted to contain fish. Air or oxygen is introduced into the water in the bottom region of each tank by suitable means to oxygenate the water. Conduits connecting the tanks conduct water successively through the tanks in a serial flow path in which the water enters each tank in its bottom region and flows upwardly in a laminar fashion to exit peripherally from the upper region of the tank. By this arrangement in each tank the flow of water carries the fish waste products upwardly out of the tank and also the head of water within the tank assists solution of the oxygen in the water thereby minimizing oxygen loss. Flow of water from one tank to the next can usually be by gravity, with the tanks being so arranged, for example, that the water level in each is spaced above the water level in the next downstream tank.

To remove the fish waste products from the water as it passes from one tank to the next, filters may be provided for removing the solid waste products from the water. In addition, as the water passes through the conduits it may be subjected to turbulence in a region communicating with the atmosphere so that dissolved gaseous waste products in the water come out of solution and vent to the atmosphere.

Aeration of the water can be effected by providing a region of each conduit in communication with the atmosphere, in which the rapid flow of water through the conduit draws in air from the atmosphere to oxygenate the water. Additional oxygenation may be provided by means such as an injector or hood within each tank which disperses oxygen-containing bubbles into the water in the bottom region of the tank. Because the water in the bottom region of the tank, which contains oxygen either from the injector or hood, or from the air drawn in in the preceding conduit, is under a substantial head of water the oxygen is under sufficient pressure to cause a major portion of it to go in solution. As the water passes upwardly through the tank much of the oxygen is used by fish for breathing while a remaining part of the oxygen is used to oxidize certain of the dissolved fish waste products in the water thus reducing their harmful effect. A residuum of the dissolved oxygen passes out of the tank still in solution in the water. It will be appreciated that by introducing the oxygen at the bottom of the tank in this manner and having an upward laminar flow of water within the tank, a significantly improved and highly efficient use of the oxygen is obtained. This is particularly important in view of the very large oxygen requirements imposed by the high concentration of fish within the water.

BRIEF DESCRIPTION OF THE DRAWINGS

A system for fish husbandry, constructed in accordance with one preferred embodiment of the invention, is illustrated in the accompanying drawings in which:

FIG. 2 is a side view of the fish tanks and the raceway shown in FIG. 1;

FIG. 3 is a cross-sectional side view of a water treating device forming a part of the system shown in FIG. 1.

FIG. 5 is an elevation in section of another tank arrangement that can be employed in practicing the invention;

FIG. 6 is an elevation in section of still another tank arrangement; and

FIG. 7 is an elevation in section of a further embodiment.

DETAILED DESCRIPTION

Figure 1:
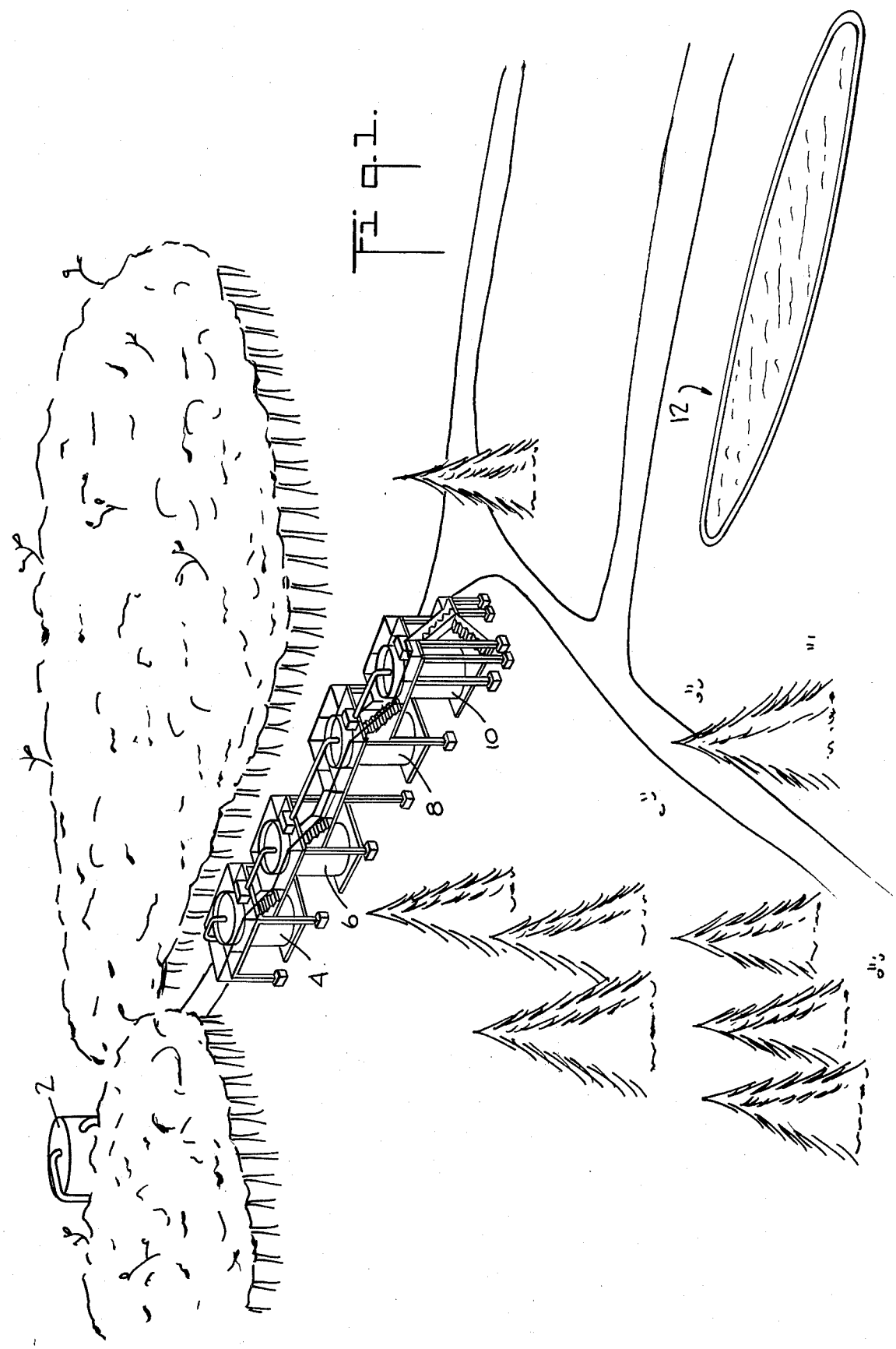
FIG. 1 is a perspective schematic view of a system of fish husbandry constructed in accordance with one embodiment of this invention, showing four water-filled fish tanks and a raceway.

Referring to FIG. 1 of the drawings, a system of fish husbandry constructed in accordance with one preferred embodiment of the invention, is there shown.

The system includes a water storage tank 2, four upright, water-filled fish tanks 4, 6, 8 and 10, and a raceway 12. The storage tank and fish tanks are mounted on concrete footings 14 (FIG. 2) on the side of a hill with the water levels in each of the tanks being vertically spaced in descending downstream relation, from the storage tank 18 to the last of the fish tanks 10. The tanks are connected by intervening conduits (described in detail hereinafter) so that water can flow from the storage tank 2 in cascade relation through the fish tanks 4–10 to the raceway 12. Water is supplied to the storage tank 2 continuously from a suitable source (not shown) to provide a continuous uniform flow of water through the system when the system is operating.

Figure 4:
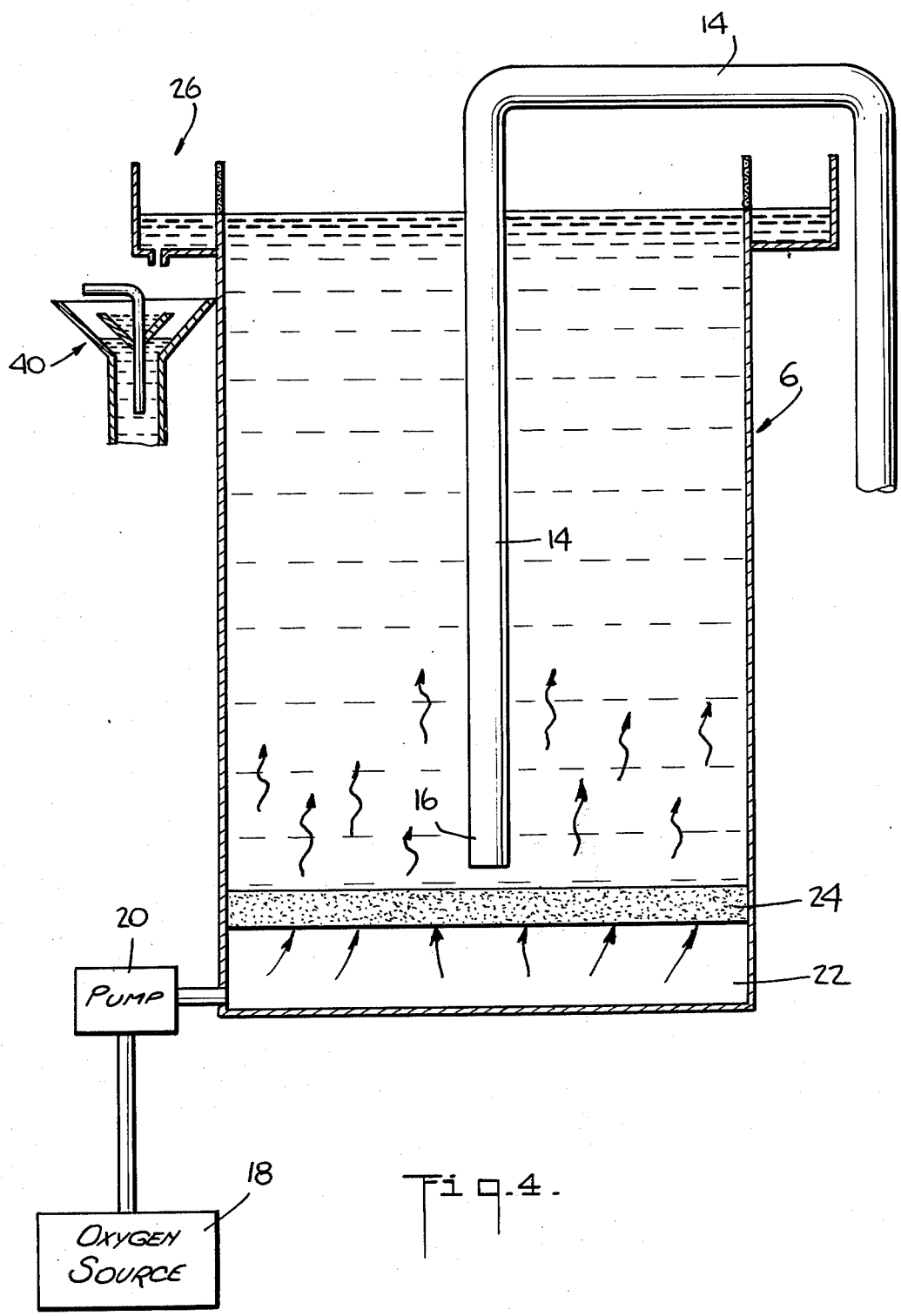
FIG. 4 is a cross-sectional side view of one of the tanks shown in FIG. 1 showing additional structure for injecting oxygen into the water.

The fish tanks 4, 6, 8 and 10 are all of similar construction and the following description of the second tank 6 (FIG. 4) applies to the other fish tanks 4, 8 and 10. The tank 6 is a massive cylindrical drum open at its upper end and, in the preferred embodiment, has a water capacity of approximately 5,500 gallons. The tank is a deep tank to provide an adequate head of water in the tank with a ratio of depth in the water-filled region to diameter, is about 3 to 1, i.e., having a height of about 17 feet and a diameter of about 7½ feet.

Fish, usually fingerlings from a suitable source, are introduced into the tank 6 through its open upper end and remain in the tank for as many months as is necessary to complete their growth to the desired size and age at which time the grown fish are removed through the open top of the tank using suitable conventional fish handling tools such as nets, scoops and the like. Within any particular one of the fish tanks, the fish will usually all be at the same stage of growth to avoid the following problems that would otherwise arise e.g. the possibility of smothering of the smaller fish by the larger fish, the problem of sorting fishes of different size upon removal from the tank, the problem of adjusting the food requirements so that some fish do not starve while others are overfed, problems of cannibalism of the smaller fish and other such problems. However, as between different fish tanks it may be desirable to have fish at one stage of growth in one tank and at a different stage of growth in another tank in order to operate the system more efficiently.

Water is introduced into the tank 6 by a vertical conduit 14 extending centrally down into the tank and connected therewith by suitable conventional supporting structure (not shown). The open lower end 16 of the conduit 14, constituting the inlet to the tank 6, is positioned in a bottom region of the tank spaced above the closed lower end thereof. The upper end of the conduit 14 communicates with the outlet of the preceding upstream tank 4 and receives water therefrom. Air or oxygen is introduced into the water passing along the conduit 14 (as will be described hereinafter) so that the water introduced into the bottom region of the tank 6 through the inlet 16 contains substantial quantities of oxygen both as dissolved oxygen and as bubbles. It will be understood that, in view of the massive nature of the tank 6, pressure in the bottom region exerted by the hydrostatic head of water in the tank is considerable (for example, using a 17 foot high tank, the pressure in the bottom region would be close to 1.5 atmosphere) tending to assist the oxygen in the bubbles into solution and maintaining the oxygen already in solution in that condition. Such an arrangement offers marked advantages over any system whereby oxygenated water is introduced at the top of a fish tank. The water then flows upwardly within the tank carrying the oxygen to the fish and providing the necessary oxygen to oxidize many of the harmful fish wastes thrown off by the fish. These fish wastes include solid excreta, and various soluble metabolites including ammonium salts and carbon dioxide.

The water in the bottom region of the tank is additionally oxygenated by a supply of oxygen from a suitable source 18, which may be a liquid oxygen bottle, connected by a pressure pump 20 to an oxygen chamber 22 at the lower end of the tank. The oxygen chamber 22 extends between the bottom of the tank and a porous plate 24 extending completely across the lower end of the drum in sealing contact with the walls thereof, spaced closely below the entry end 16 of the pipe 14. The plate 24 is a fine pore porous floor or cylindrical air diffuser through which oxygen is injected into the tank in a bubble size preferably somewhere between 0.1 and 0.5 millimeters in diameter. The diameter of these bubbles will decrease as the oxygen bubbles move up through the tank and are dissolved in the water.

Alternatively, the plate 24 can be composed of a Carborundum stone or any other diffuser or the plate can be criss-crossed with fine mesh nylon tubes into which oxygen is pumped. It will be understood that the pressure at which the oxygen is introduced has to be sufficiently high to overcome the water pressure on the upper side of the plate. In the same way as previously described the fact that the oxygen is introduced at the bottom of the tank enables the hydrostatic head of the water in the tank to be used to advantage in assisting the oxygen into solution, thereby contributing to the most efficient use of the oxygen supplied. The water in the bottom region should be as near saturated as possible with oxygen. Excess bubbles of oxygen rising in the tank pass into solution as the oxygen already in solution is used by the fish and is used to oxidize waste products. For example, at a water temperature of 50°F, a close to saturation dissolved oxygen level may be between 9.5 and 10.0 milligram per liter of water.

The plate 24 insures that the bubbles are introduced into the tank evenly over its entire width so that oxygen is carried throughout substantially the entire volume of water in the tank.

Furthermore, by placing the plate 24 adjacent the lower end 16 of the pipe 14, the incoming water is forced to spread out across the bottom of the tank to the walls thereof, so that the air in the incoming water from the conduit is also distributed equally over the entire cross-sectional area thereof. The water flow distribution thus effected causes the water in the tank to move upwardly as a generally uniform, non-turbulent body extending substantially across the entire width of the tank, i.e. in a laminar pattern, so that the up-flow of water carries the oxygen to all the fishes whether they are at the center or the periphery of the tank and at the same time carries upwardly substantially all the waste products they produce.

It will be understood that an important feature of the invention thus far described is the provision of an upward flow of oxygenated water from the bottom of the tank to the top. Significant advantages arising from the use of the upward flow are the use of the hydrostatic head of the water within the tank to maintain the oxygen in the water in solution, and the movement of substantially all the waste products to the top of the tank where they pass out of the tank thus minimizing or even eliminating the need for draining of the tank to remove built up wastes. Also the upward flow of liquid, as opposed to a downward flow, enables the weaker fish to maintain their position within the tank without being driven to the bottom of it.

Another factor that has been found to be of great importance is the rate and type of upward flow of the water in the tank. If the rate of flow is too slow, fish wastes will fall to the bottom of the tank and a dangerously high toxic level may build up. If the rate is too high the fish may tend to be carried to the top of the tank and subjected to over pressure, in addition the water may become turbulent which can disturb the fish and adversely affect their growth rate and also reduce the efficiency with which the waste products are removed. It has been discovered that the optimum conditions for flow are a minimum upward flow rate of about one foot per minute uniformly across the tank with the condition of flow being laminar, i.e. non-turbulent, a condition sometimes described as slug flow.

The water arriving at the upper end of the tank 6 spills over the upper end of the wall of the tank into an annular chamber 26 formed by a toroidal L-shaped channel member 28 secured to and extending around the tank 6 adjacent the upper end thereof. Extending upwardly around the upper end of the tank 6 above the water level is an annular screen 30, which in the preferred embodiment is formed from ⅛ inch – ½ inch wire mesh, through which the water leaving the interior of the drum passes to enter the annular chamber 26. The annular screen 30 filters out the solid wastes in the water which build up on the interior of the screen and additionally prevents any fish from passing into the annular channel 26. Periodically the wastes are scraped from the interior of the screen 30 by a workman using a scoop. Other waste products which are lost in some degree at the upper end of the tank are dissolved gaseous products, including ammonia and carbon dioxide, part of which pass into the atmosphere while some oxygen is absorbed therefrom.

It will be appreciated that it may be necessary to treat the water leaving each fish tank before delivering it to the next downstream fish tank to reduce the level of harmful dissolved wastes and re-oxygenate the water. For these purposes each of the fish tanks 4, 6, 8 and 10 in the embodiment described is provided with a water treatment unit 40 (FIG. 2) at the outlet from the tank. The treatment unit 40 (FIG. 3) is positioned beneath an outlet spout 42 in the channel member 28, through which water pours downwardly from the chamber 26. Positioned beneath the spout 42 is an upwardly facing outer cone 44 communicating at its lower end with the conduit 14 supplying the next downstream tank. Positioned concentrically within and spaced vertically from the outer cone is an inner cone 46. It will be understood that conventional supporting structure (not shown) connects the cones 44 and 46 with the adjacent tank. A short vertical pipe 48 passes centrally through and is supported by the inner cone 46, and has its upper end bent horizontally away from the tank.

The inner cone 46 is positioned beneath the spout 42 so that water pouring from the tank through the spout is directed into the inner cone. From there the water splashes over into the outer cone 44. The splashing action imparted by the inner cone turbulates the water quite violently causing dissolved waste product gases, notably carbon dioxide, to come out of solution and pass into the atmosphere. In this way the water is treated to remove a substantial portion of the dissolved gaseous waste products.

The water that splashes out of the inner cone 46, as previously mentioned, passes into the outer cone 44. The conduit 14 to which the outer cone 44 is connected is of U-shaped configuration so that it has a standing column of water at all times in the conduit which extends up into the upper cone 44 where the level of the surface of the water is spaced below the water in the inner cone. As the water passes down through the conduit 14 it passes at a rapid rate of flow past the open lower end of the pipe 48 causing air to be sucked through the open upper end of the pipe 48 by a venturi-like effect, into the flowing water. Thus at its entry into the next downstream tank, the inflowing water contains both oxygen in solution and bubbles of air.

The water leaving the treatment unit 40 of the last fish tank 10 in the series, flows through a conduit 50 to the previously mentioned raceway 12. Fish may also be raised, though at a lower concentration, in the raceway 12 which is a shallow pond-like body of water having a large surface area. The large surface area of the raceway enables a substantial proportion of the dissolved gases in the water to escape into the atmosphere.

The described combination of four fish tanks provides a particularly satisfactory arrangement from the point of view of efficient use of water, although greater or fewer numbers of tanks may be utilized. Of course the water will degrade somewhat in quality from the first fish tank to the last, particularly with respect to the amount of ammonia contained therein, and as a consequence it may be found that the maximum density of fish that can be grown in each tank will decrease somewhat as the tank is further along in the flow of water. However as fish at different stages of growth require different densities of confinement, it is possible to arrange that fishes requiring a lesser concentration in confinement be placed in a tank farther downstream than fishes in a stage of growth which permits raising at a greater concentration.

To feed the fish, fish food is dropped in the upper end of the tank at appropriate intervals. The density of the fish food is sufficiently great to permit it to sink downwardly within the tank at a greater rate than the upflow of water carrying the waste products, so that the food is distributed to the fish.

The concentration of fish in the water that this invention contemplates making possible is a concentration of at least six pounds of fish per cubic foot of water. Maintaining fish life at this order of concentration requires a continuous rapid flow of water with relatively high oxygen content in order to clear away growth inhibiting metabolites and provide growth stimulating oxygen, as previously mentioned. Thus the actual economic consideration is the number of pounds of fish that can be grown per unit flow of water per minute. It is contemplated that this invention will permit achieving growth rates of up to as much as about fifty pounds of fish for each gallon per minute flow of water in the overall system. In this connection the following exemplary table relating to the growth of trout is of interest.

TABLE

Growth of Trout

| | | | | |
|---|---|---|---|---|
| Concentration lb. fish/cu. ft. water | | 9.0 | | |
| Fish raised per unit flow of water lb/gal/min (per tank) | | 13.5 | | |
| Conversion rate lb.food/lb. fish | | 1.5 | | |
| Length in inches | 2 4 6 8 10 | | | |
| Feed rate at 50°F. % body weight/day | 3.4 2.0 1.4 1.1 0.9 | | | |

Summarizing the above disclosure, the high density of fish in the tanks is from about 0.5 pounds per gallon of space up to about 2 pounds per gallon and under high oxygen conditions could be as high as 3 pounds per gallon. The usual range is about 1.25 pounds of fish per gallon of space in the tank. In addition, the high density process of the present invention includes the water flow rate of from about 10 to about 20 pounds of fish per gallon of water per minute per tank.

Since the basic concept of the present invention involves the intensive raising of fish with an upward laminar flow of water at a velocity of about one foot per minute, it is contemplated as being possible within the scope of this invention to utilize fish rearing tanks in which the height to diameter ratio may be somewhat less than 1 to 1 so long as the laminar flow pattern and the minimum upward velocity are maintained.

FIGS. 5-7 inclusive show tank arrangements exemplifying height to diameter ratios, respectively, of about 1.5 to 1, 2.3 to 1, and 0.8 to 1. Each such embodiment is shown as incorporating an oxygenation hood 51 of the type described in U.S. Pat. No. 3,643,403 entitled "Downflow Bubble Contact Aeration Apparatus and Method" issued to Richard E. Speece on Feb. 22, 1972, the disclosure of said patent being incorporated herein by reference. Oxygen or air is suppplied to hood 51 through conduit 52 in the manner described in said patent. In each embodiment, however, it is to be understood that the water flow pattern and rate in the tank must comply with the above disclosed parameters.

In the arrangements shown in FIGS. 5-7 inclusive, the incoming water is delivered downwardly through the entrance or delivery conduit 53 and at a suitable point below the throat or constriction 54 air or preferably oxygen is introduced into the downflowing stream by means of conduit 52, whereupon the oxygen is dissolved in accordance with the method outlined in the aforesaid Speece patent. The water exits at the bottom of the hood, which is supported on legs 55, the water flow pattern being as shown by arrows AA.

Water passes upwardly in the previously described laminar flow pattern and over the top of the tank and into peripheral trough 56.

The dimensions of the tank shown in FIG. 5, which provide a height to diameter ratio of about 1.5 to 1, is derived from an available water flow rate of 330 gallons per minute, recognizing the requirement of a one foot per minute upward velocity in the tank. The dimensions are derived by means of the following calculations:

a. $330 \ gpm \times 0.134 = 44.1$ cu. ft. per min.

b. the diameter required to provide a vertical height of 1 ft. is:

$$\frac{\pi d^2}{4} \times h = 44.1$$

$$\frac{\pi d^2}{4} \times 1 = 44.1$$

$$d^2 = \frac{44.1 \times 4}{\pi}$$

$$d = \sqrt{\frac{44.1 \times 4}{\pi}} = 7.5 \text{ ft. diameter}$$

c. 330 *gpm* at 13 pounds of fish per gallon per minute* gives 4290 pounds of fish d. one cubic foot of water will support 8.5 pounds of fish (trout), so $$\frac{4290}{8.5} = \frac{504 \text{ cubic feet required - total}}{\text{volume of tank with 7.5 ft. diameter}}$$

e. $\frac{\pi d^2}{4} h = 504$ $$h = \frac{504 \times 4}{\pi \times (7.5)^2} = 11.4 \text{ feet high}$$

* As mentioned above, each tank can support about 10 to 20 pounds of fish per gallon of water per minute; therefore, use of the figure 13 is a conservative approach.

Similar calculations establish that the tank depicted in FIG. 6 with a ratio of about 2.3 to 1 would handle 500 gallons of water per minute, have a diameter of 7.5 and a height of 17.3 feet. The tank depicted in FIG. 7 would handle 1,800 gallons per minute and have a diameter of approximately 17.5 and a height of at least about 11.5.

As can be seen from the above, the relevant dimensions of the tanks may vary, depending on the available flow rate but in each case the essential upward velocity of 1 foot per minute is maintained.

While certain embodiments of the invention have been shown and described herein, it is to be understood that changes and additions may be made by those skilled in the art without departing from the scope and spirit of the invention.

I claim:

1. A method of rearing fish at high density in a controlled environment, characterized by the steps of confining the fish during their period of growth in at least one vertically extending space the ratio of height to width of which is about 3 to 1 and which contains a body of water at or near oxygen saturation level, continuously supplying water at or near oxygen saturation level to the bottom of said space, and continuously overflowing used water at the top of said space, the flow of water through the space being a quiescent substantially unidirectional upward laminar flow of about 1 foot per minute.

2. In the method of claim 1, said density being in excess of about 6 pounds of fish per cubic foot of water containing space.

3. In the method of claim 1, the relationship of the quantity of fish to the flow rate of water being up to about 50 pounds of fish for each gallon per minute flow of water through said space.

4. The method of claim 3 including the step of oxygenating said water prior to its upward passage through said space.

5. A method for growing fish under controlled environmental conditions, which comprises, providing at least one substantially vertical growth zone whose ratio of height to longest cross-sectional dimension is at least 3:1, moving a body of water continually upward in said zone by continually introducing water under pressure into the bottom of said zone, introducing a predetermined amount of substantially uniform sized fish to be grown into said growth zone, continually dissolving oxygen in said water from oxygen-containing gas introduced into the lower portion of said zone, regulating the rate of introduction of water into said zone so that water continually flowing therethrough is removed at an upper portion of the zone at a rate of approximately 1 foot per minute, periodically introducing fish feed into said growth zone, continually collecting fish offal from the flowing water at the top of said zone and removing the collected fish offal, continuing the introduction of water, oxygen-containing gas and feed until the desired fish growth is reached; and removing fish of increased size from the growth zone.

6. A method according to claim 5 in which ratio of height to cross-sectional dimension of the growth zone is approximately 3:1.

7. A method according to claim 5 in which the conditions of growth medium simulate those found in the natural habitat of the fish species undergoing growth.

8. A method of intensive fish farming in a controlled environment comprising the steps of confining the fish during their period of growth in at least one vertically extending space containing a body of water at about oxygen saturation level, conducting water through said space from bottom to top in a substantially uniform upward direction across the width of said space at a velocity of at least one foot per minute and removing the overflow of water containing waste matter peripherally at the top of said space, said space being generally cylindrical and having a vertical height to diameter relationship defined by the formula:

$$H/D = \frac{4FG}{\pi D^3 X}$$

where
$H =$ height in feet
$F =$ pounds of fish per gallon of water flow per minute
$X =$ pounds of fish per cubic foot of space
$G =$ gallons per minute of water flow
$D =$ diameter in feet $=$ $$\left\{ \frac{0.134 G4}{\pi} \right\}^{1/2}$$

9. The method of claim 8 wherein
$F =$ from about 10 to about 20
$G =$ from about 330 to about 1800
$X =$ at least about 6

10. The method of claim 8 wherein
$F = 13$
$X = 8.5$
$G =$ about 500

* * * * *